United States Patent
Voss et al.

(10) Patent No.: US 10,983,938 B2
(45) Date of Patent: Apr. 20, 2021

(54) FIELD BUS SYSTEM FOR DRIVING POWER OUTPUTS

(71) Applicant: WAGO Verwaltungsgesellschaft mbH, Minden (DE)

(72) Inventors: Christian Voss, Minden (DE); Daniel Janos Moehlenbrock, Werther (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 16/738,570

(22) Filed: Jan. 9, 2020

(65) Prior Publication Data
US 2020/0218680 A1 Jul. 9, 2020

(30) Foreign Application Priority Data
Jan. 9, 2019 (DE) .................. 10 2019 100 428.4

(51) Int. Cl.
*G06F 13/38* (2006.01)
*H02J 3/00* (2006.01)

(52) U.S. Cl.
CPC ............. *G06F 13/38* (2013.01); *H02J 3/00* (2013.01); *G06F 2213/40* (2013.01)

(58) Field of Classification Search
CPC ........ G06F 13/38; G06F 2213/40; H02J 3/00; H02J 13/00016; G05B 19/4185; G05B 2219/33139; Y04S 40/124; Y02E 60/00
See application file for complete search history.

(56) References Cited

U.S. PATENT DOCUMENTS

| | | | | |
|---|---|---|---|---|
| 4,183,003 A | * | 1/1980 | Cleveland | H01H 9/102 337/156 |
| 6,420,976 B1 | * | 7/2002 | Baggs | H02J 13/00009 340/853.3 |
| 2001/0056304 A1 | * | 12/2001 | Nitta | G05B 19/0428 700/21 |
| 2003/0058623 A1 | * | 3/2003 | Veil | F16P 3/00 361/728 |
| 2007/0255429 A1 | * | 11/2007 | Hauf | G05B 19/0428 700/19 |
| 2010/0064297 A1 | * | 3/2010 | Doll | H04L 12/403 719/315 |

(Continued)

OTHER PUBLICATIONS

Wachendorf Prozesstechnik GmbH & Co. KG, Specification HD67565.
(Continued)

*Primary Examiner* — Farley Abad
(74) *Attorney, Agent, or Firm* — Muncy, Geissler, Olds & Lowe, P.C.

(57) ABSTRACT

A system having a field bus coupler, a first module and a second module is provided. The field bus coupler includes a first field bus interface to a field bus and a first sub-bus interface to a sub-bus. The first module includes a control interface for connection to a control bus, a second sub-bus interface for communication with the field bus coupler and a first control output. The second module includes a control input and a power output. The first module is configured to derive a control signal from a signal which is received via the control interface during operation, and the second module is configured to control the power output of the second module in coordination with the control signal received via the control input.

10 Claims, 6 Drawing Sheets

(56) References Cited

U.S. PATENT DOCUMENTS

| | | | | |
|---|---|---|---|---|
| 2012/0296446 A1* | 11/2012 | Neupartl | ............ | G05B 19/0428 |
| | | | | 700/1 |
| 2013/0031164 A1* | 1/2013 | Sundaram | .............. | H02H 7/261 |
| | | | | 709/203 |
| 2016/0103436 A1* | 4/2016 | Buda | .................. | G05B 19/0426 |
| | | | | 700/22 |
| 2018/0276153 A1* | 9/2018 | Hansing | ............ | H04L 12/40032 |

OTHER PUBLICATIONS

Wachendorf Prozesstechnik GmbH & Co. KG, Brochure HD67565, p. 1 (2016).
Spectra GmbH & Co. KG, Brochure PET-7242, pp. 1-2 (2014).
Spectra GmbH & Co. KG, Brochure WISE-7102, pp. 1-2 (2014).

* cited by examiner

FIELD BUS SYSTEM FOR DRIVING POWER OUTPUTS

This nonprovisional application claims priority under 35 U.S.C. § 119(a) to German Patent Application No. 10 2019 100 428.4, which was filed in Germany on Jan. 9, 2019, and which is herein incorporated by reference.

BACKGROUND OF THE INVENTION

Field of the Invention

The present invention relates to a field bus system, comprising a field bus coupler and series-connected modules. In particular, the present invention relates to a field bus system for driving power outputs.

Description of the Background Art

When switching power outputs in telecontrol systems, increased requirements for determinism and response time may exist.

SUMMARY OF THE INVENTION

In this regard, the invention enlarges the technical knowledge in the form of systems according to the invention, which conduct switching commands for driving power outputs not via the field bus coupler but via a separate module connected in series to the field bus coupler, so that the requirements for the field bus coupler with regard to determinism and response time are reduced.

A system according to an exemplary embodiment of the invention comprises a field bus coupler, the field bus coupler including a first field bus interface to a field bus and a first sub-bus interface to a sub-bus, a first module, the first module including a control interface for connection to a control bus, a second sub-bus interface for communication with the field bus coupler, and a first control output, and a second module, the second module including a control input and a power output. The first module is configured to derive a control signal from a signal which is received via the control interface during operation. The second module is configured to control the power output of the second module in coordination with the control signal received via the control input.

The term "field bus coupler," as used in the description and the claims, can be understood to be, for example, a device having a field bus interface, which is configured to transmit status signals via the field bus to a higher-level controller and to receive control signals from the higher-level controller. The term "module," as used in the description, can be furthermore understood to be, for example, a bus terminal, which is configured for series connection to a field bus coupler, a serial mechanical and electrical chaining of a plurality of bus terminals being facilitated by the series connection.

In addition, the term "sub-bus," as used in the description and the claims, can be understood to be, for example, a bus system, which connects a plurality of bus terminals and the field bus coupler. The term "field bus," as used in the description and the claims, can be furthermore understood to be, for example, a bus system, via which multiple field bus couplers are connected to the higher-level controller. In addition, the term "control bus," as used in the description and the claims, can be understood to be, for example, a bus system, via which control commands are exclusively or essentially transmitted, and on which special requirements relating to determinism and response time are imposed.

The term "control input/output," as used in the description and the claims, can be furthermore understood to be, for example, an electrical connection, via which a control signal is input or output during operation. Moreover, the term "power output," as used in the description and the claims, can be understood to be, for example, an electrical connection, via which higher voltages/currents are output than are input via the control input, so that relatively high voltages/current are controllable with the aid of relatively low voltages/currents.

The first module can include a second control output and is configured to receive configuration data from the field bus coupler via the second sub-bus interface during an initialization routine and to derive from the configuration data an assignment between signals received via the control interface during operation and control signals to be output via the first and second control outputs.

The second module can include a third sub-bus interface for communication with the field bus coupler and is configured to transmit data relating to control signals received via the control input and/or voltages and/or currents output at the power output to the field bus coupler via the third sub-bus interface.

The second module can include an interface for requesting a status of a device controlled by the second module and is configured to transmit data relating to a requested status to the field bus coupler via the third sub-bus interface.

The first module can be configured to initiate a test operation in response to a command of the field bus coupler and, with regard to the signals received via the control interface during the test operation, to generate data indicating which control signals are derived from the aforementioned signals or would be derived during operation and to transmit the generated data to the field bus coupler.

The system preferably also comprises a transformer, the second module being configured to induce a mains disconnection of the transformer in response to corresponding signals received via the control interface.

The first module and/or the second module can be configured for series connection to the field bus coupler.

The control interface can be designed as an Ethernet or fiber-optic interface.

The first module can be configured to receive "Generic Optic-Oriented Substation Event" (GOOSE) datagrams via the control interface.

A method according to the invention for disconnecting a transformer from a power supply network, using the system, comprises a transmission of a disconnect command from a master computer to the first module via the control interface, a deriving of a control command from the disconnect command and transmission of the control command to the control input of the second module via the first control output, and a switching, by the second module, of the power output in response to the receipt of the control command, the switched power output inducing a disconnection of the transformer with the aid of a load-break switch.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
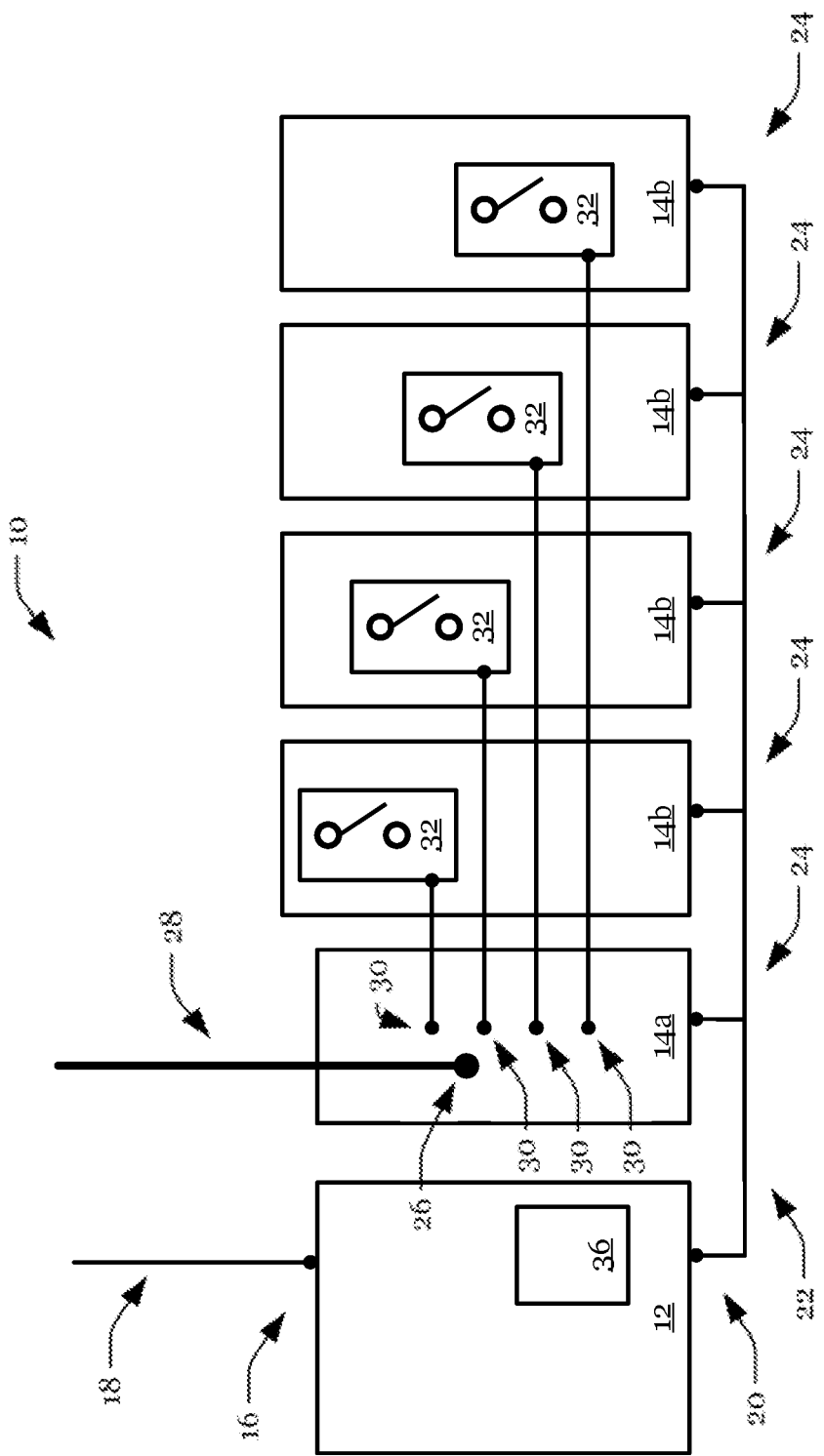
FIG. 1 shows a block diagram of a system according to the invention.

FIG. 1 shows a system 10 comprising a field bus coupler 12 and modules 14a, 14b (field bus terminals) connected in series to field bus coupler 12. Field bus coupler 12 includes a first field bus interface 16 to a field bus 18 and a sub-bus interface 20 to a sub-bus 22. Series-connected modules 14a, 14b also include sub-bus interfaces 24 to sub-bus 22, so that a communication between field bus coupler 12 and the modules may take place via sub-bus 22. First series-connected module 14a includes, in addition to sub-bus interface 24, a control interface 26 for connection to a control bus 28. Control interface 26 may be designed, for example, as an Ethernet or fiber-optic interface, via which Generic Object-Oriented Substation Event (GOOSE) datagrams are received.

Figure 2:
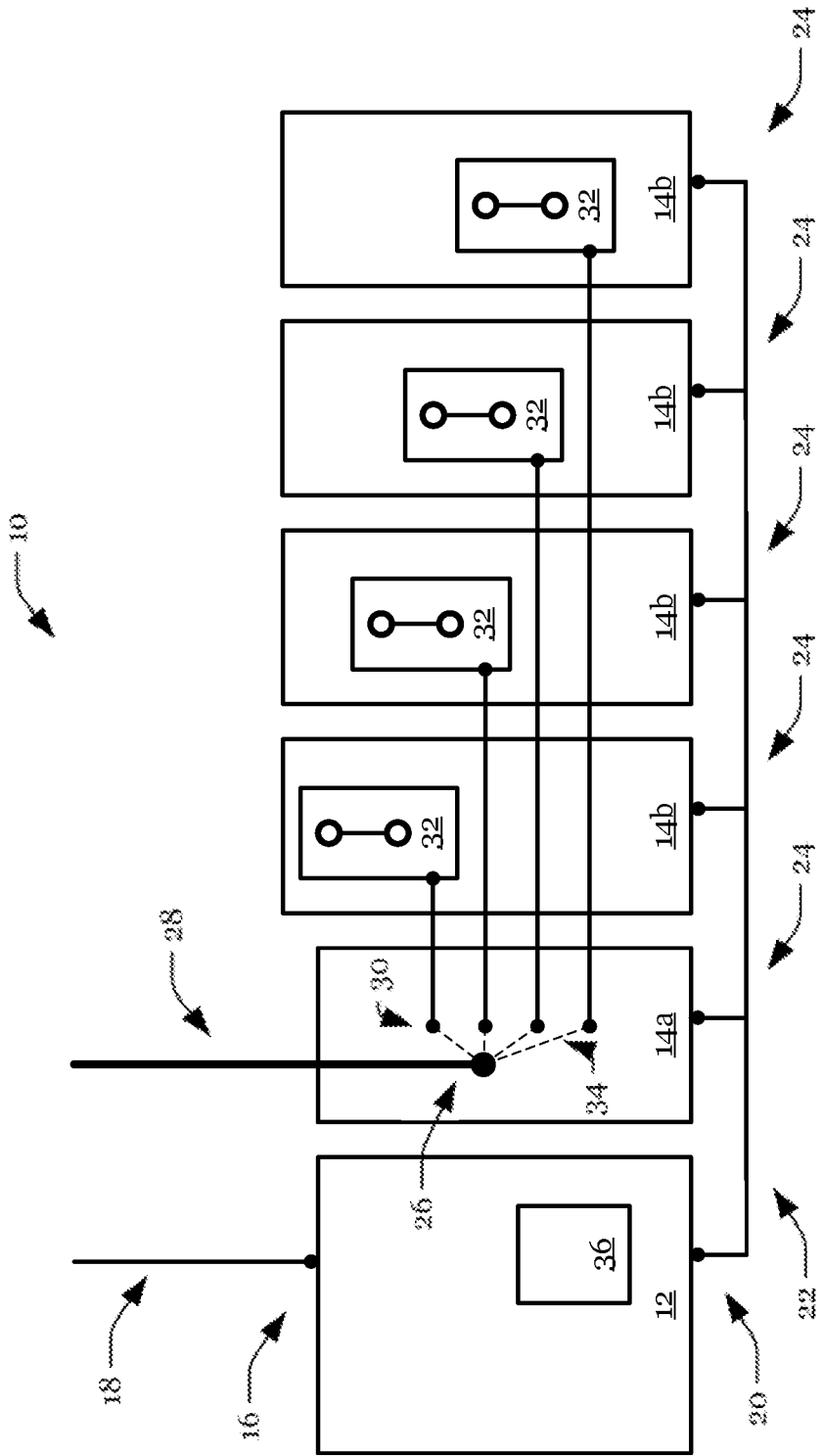
FIGS. 2 to 5 show the use of the system according to the invention.

First series-connected module 14a furthermore includes a plurality of control outputs 30 and is configured to derive a control signal from a signal received via control interface 26 during operation and output it to one of control outputs 30. A power output 32 of a module 14b connected in series to first module 14a is controlled via the control signal. As indicated in FIG. 2, assignment 34 between the signal received via control interface 26 and a control signal to be output at a control output 30, via which a power output 32 is controlled, may be fixed or configurable. For example, configuration data may be provided by field bus coupler 12 during an initialization routine, and assignment 34 between the signals received via control interface 26 and control signals to be output via control outputs 30 may be derived from the configuration data.

Figure 3:
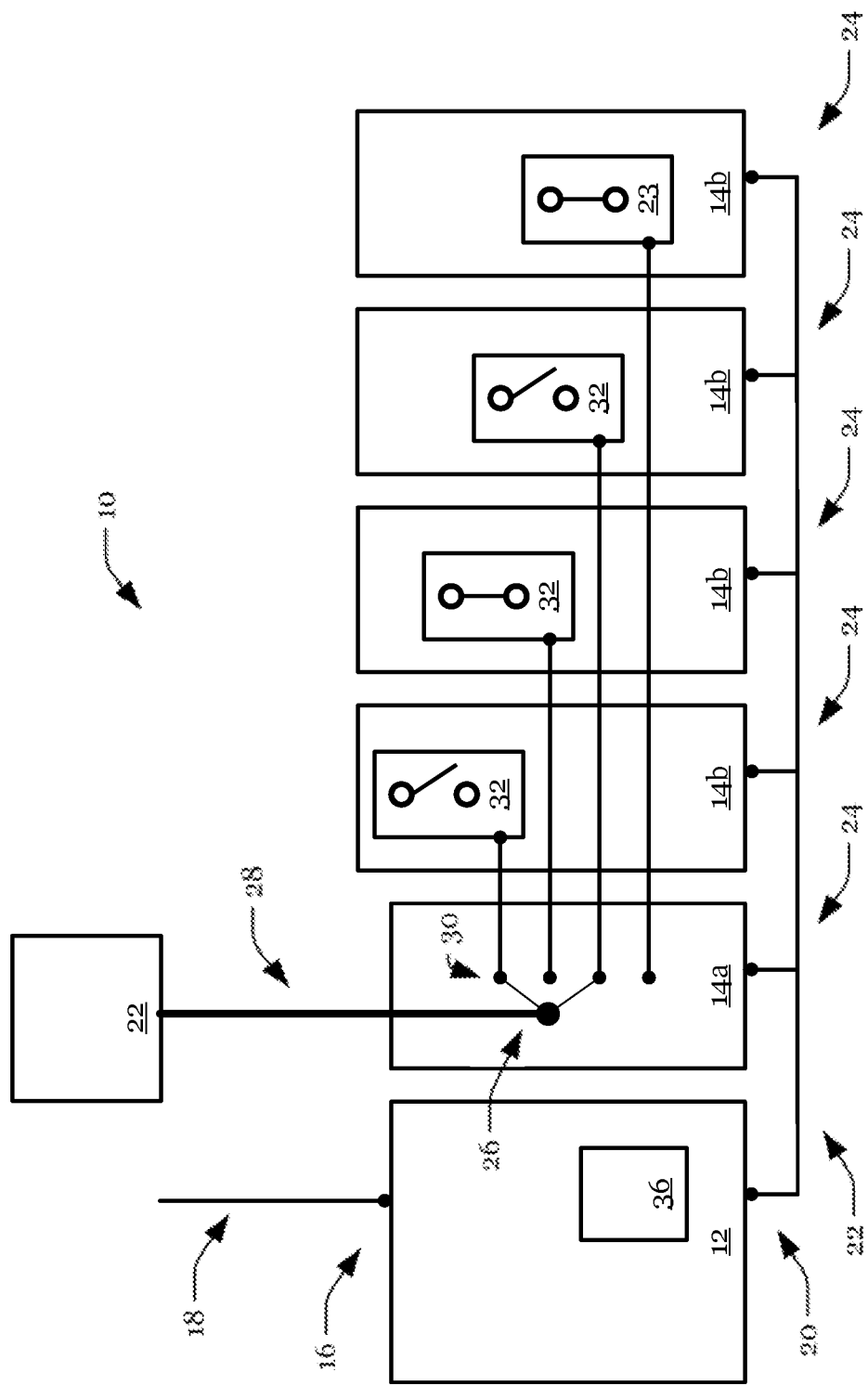
Figure 4:
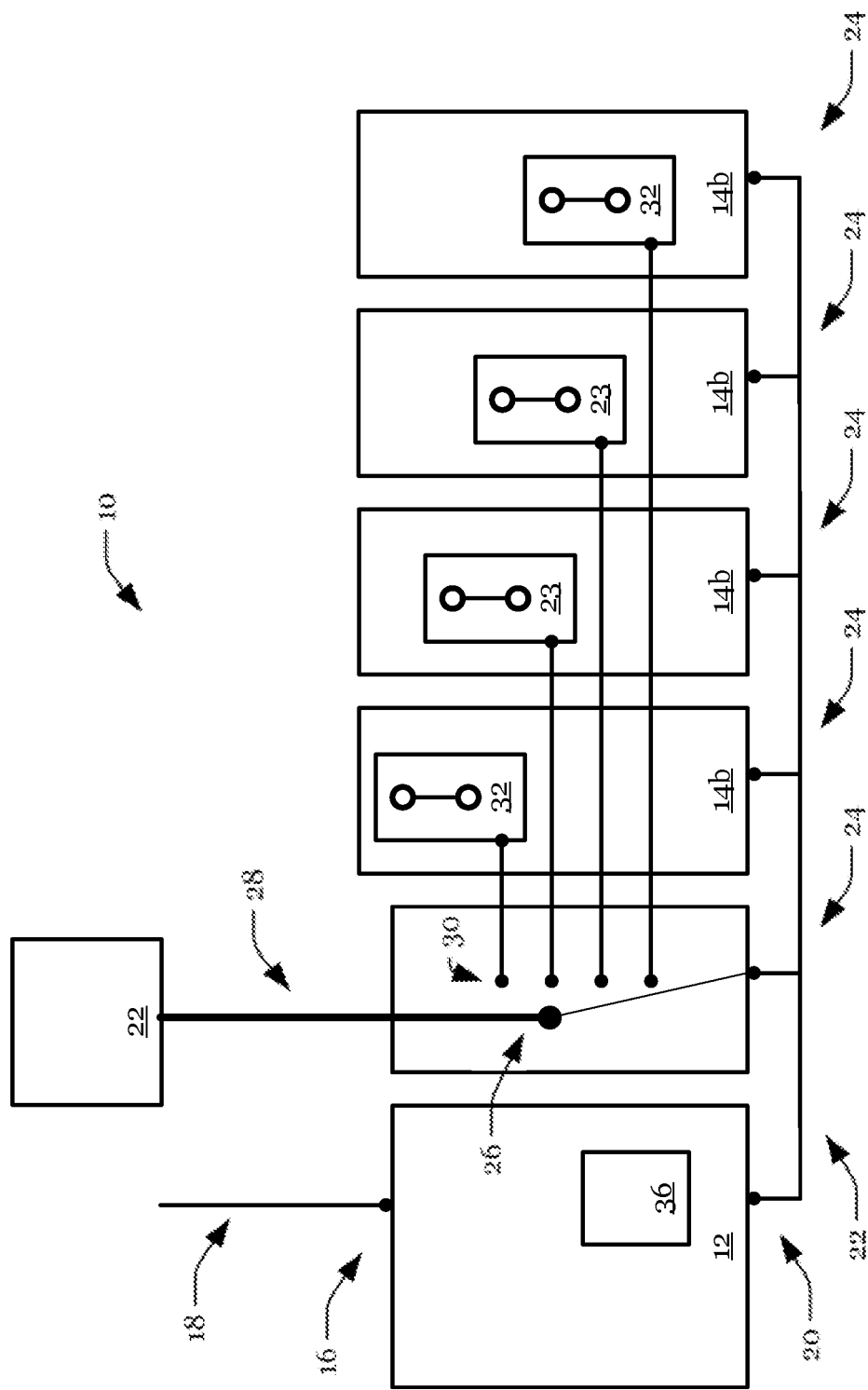

If a signal is then received via control interface 26 during operation, module 14 outputs control signals to particular control output(s) 30, as illustrated in FIG. 3, whereby power outputs 32 connected to control outputs 30 may be switched. In addition, as illustrated in FIG. 4, first module 14 is configured to initiate a test operation in response to a command of field bus coupler 12 and, with regard to the signals received via control interface 26 during the test operation, to generate data indicating which control signals are derived from the aforementioned signals or would be derived during operation and to transmit the generated data to field bus coupler 12. The switching of power outputs 32 may thus be paused during the test operation, and the functionality of first module 14 may be checked (during operation).

Moreover, modules 14b connected in series to first module 14a may be configured to transmit data relating to control signals received via the control input and/or voltages and/or currents output at power output 32 to field bus coupler 12 via sub-bus interface 24 (for monitoring and/or diagnostic purposes). In addition, modules 14b may be configured to transmit data relating to the status of the devices controlled by module 14b to field bus coupler 12 (for monitoring and/or diagnostic purposes). The transmitted data may be stored, for example, in a memory of field bus coupler 12 and requested (cyclically) by a central control unit via field bus 18.

Figure 5:
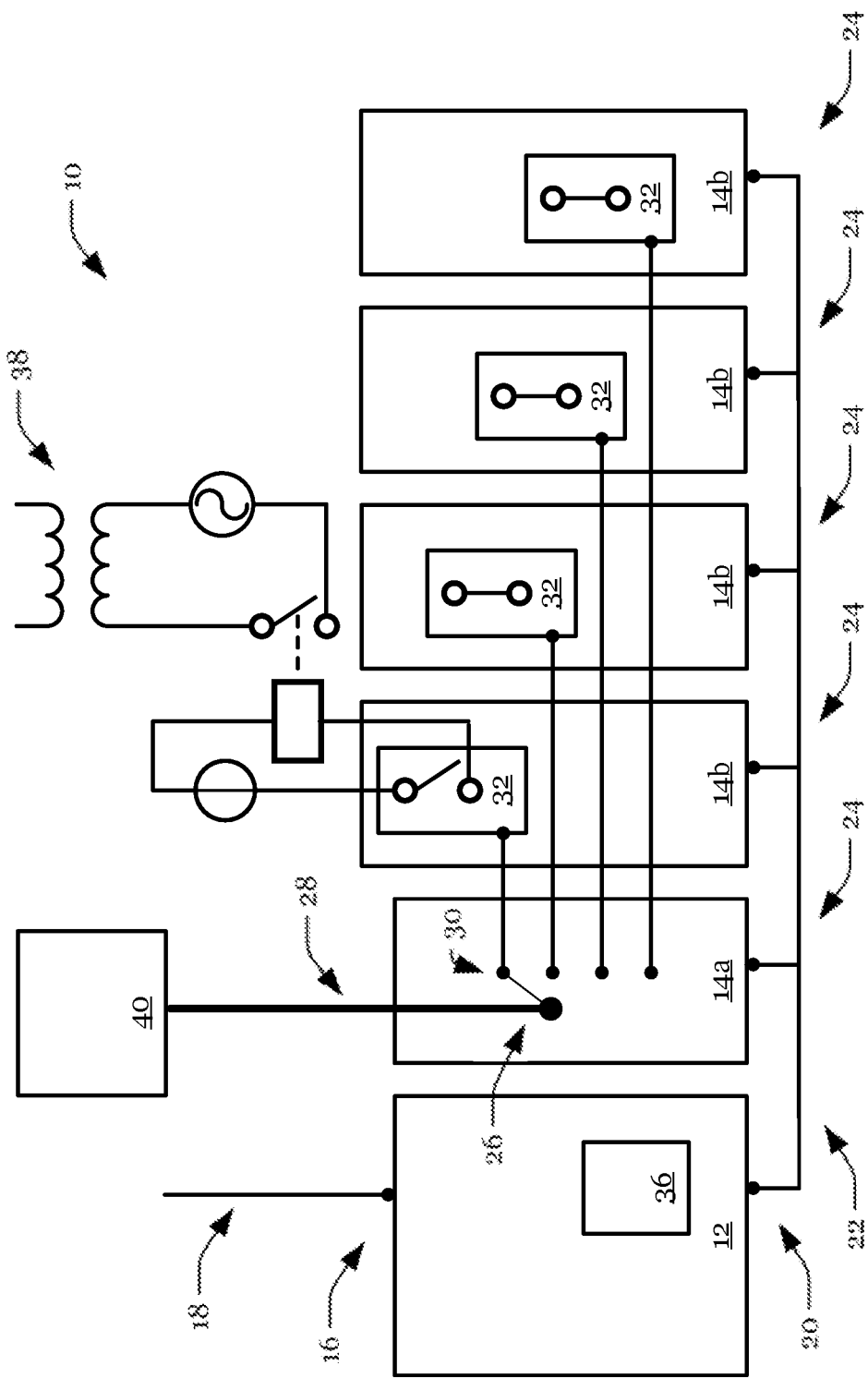
Figure 6:
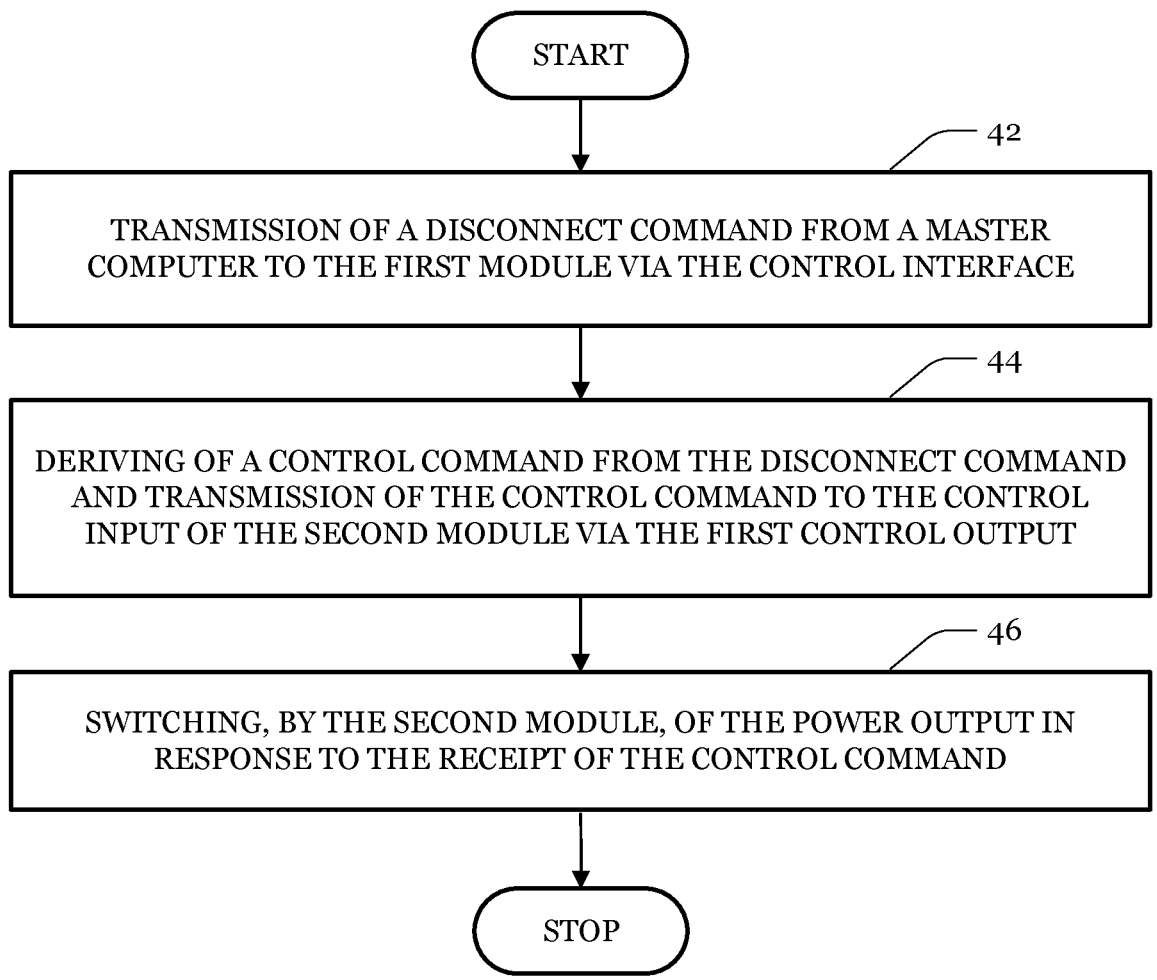
FIG. 6 shows a flow chart of a method according to the invention.

As illustrated in FIG. 5, for example, a module 14b may be used to control a transformer 38 (of a power supply network). If, as in step 42 of the flowchart illustrated in FIG. 6, a master computer 40 transmits a disconnect command via control interface 26 to command to first module 14a, the latter derives a control signal from the disconnect command according to step 44 (according to assignment 34) and outputs it at corresponding control output 30. In step 46, power output 32 of module 14b is de-energized by the control signal.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system comprising:
   a field bus coupler having a first field bus interface connectable to a field bus and a first sub-bus interface connectable to a sub-bus;
   a first module including a control interface for connection to a control bus, a second sub-bus interface for communication with the field bus coupler and a first control output; and
   a second module including a control input and a power output;
   wherein the first module is configured to derive a control signal from a signal which is received via the control interface during operation and output the control signal via the first control output,
   wherein the second module is configured to control the power output of the second module in coordination with the control signal received via the control input,
   wherein the first control output of the first module communicates directly with the control input of the second module, and
   wherein the first module has a second control output and is configured to receive configuration data from the field bus coupler via the second sub-bus interface during an initialization routine and to derive from the configuration data an assignment between signals received via the control interface during operation and control signals to be output via the first and second control outputs.

2. The system according to claim 1, wherein the second module includes a third sub-bus interface for communication with the field bus coupler and is configured to transmit data relating to control signals received via the control input and/or voltages and/or currents output at the power output to the field bus coupler via the third sub-bus interface.

3. The system according to claim 2, wherein the second module includes an interface for requesting a status of a device controlled by the second module and is configured to transmit data relating to a requested status to the field bus coupler via the third sub-bus interface.

4. The system according to claim 1, further comprising:
   a transformer,
   wherein the second module is configured to induce a mains disconnection of the transformer in response to a corresponding signal received via the control interface.

5. The system according to claim 1, wherein the first module and/or the second module are configured for series connection to the field bus coupler.

6. The system according to claim 1, wherein the control interface is an Ethernet or fiber-optic interface.

7. The system according to claim 1, wherein the first module is configured to receive "Generic Optic-Oriented Substation Event" (GOOSE) datagrams via the control interface.

8. A method for disconnecting a transformer from a power supply network via the system according to claim 1, the method comprising:
   transmitting a disconnect command from a master computer to the first module via the control interface;
   deriving a control command from the disconnect command and, based on the configuration data received from the field bus coupler, transmitting the control command from the first control output or the second control output of the first module directly to the control input of the second module; and
   switching the power output by the second module in response to the receipt of the control command,
   wherein the switched power output induces a disconnection of the transformer via a load-break switch.

9. A system comprising:
   a field bus coupler having a first field bus interface connectable to a field bus and a first sub-bus interface connectable to a sub-bus;
   a first module including a control interface for connection to a control bus, a second sub-bus interface for communication with the field bus coupler and a first control output; and
   a second module including a control input and a power output;
   wherein the first module is configured to derive a control signal from a signal which is received via the control interface during operation,
   wherein the second module is configured to control the power output of the second module in coordination with the control signal received via the control input, and
   wherein the first module has a second control output and is configured to receive configuration data from the field bus coupler via the second sub-bus interface during an initialization routine and to derive from the configuration data an assignment between signals received via the control interface during operation and control signals to be output via the first and second control outputs.

10. A system comprising:
   a field bus coupler having a first field bus interface connectable to a field bus and a first sub-bus interface connectable to a sub-bus;
   a first module including a control interface for connection to a control bus, a second sub-bus interface for communication with the field bus coupler and a first control output; and
   a second module including a control input and a power output;
   wherein the first module is configured to derive a control signal from a signal which is received via the control interface during operation,
   wherein the second module is configured to control the power output of the second module in coordination with the control signal received via the control input, and
   wherein the first module is configured to initiate a test operation in response to a command of the field bus coupler and, with regard to the signals received via the control interface during the test operation, to generate data indicating which control signals are derived from the aforementioned signals or would be derived during operation and to transmit the generated data to the field bus coupler.

* * * * *